July 23, 1940.  E. S. CORNELL, JR  2,208,629
RADIATOR VALVE OR THE LIKE
Filed Jan. 24, 1939
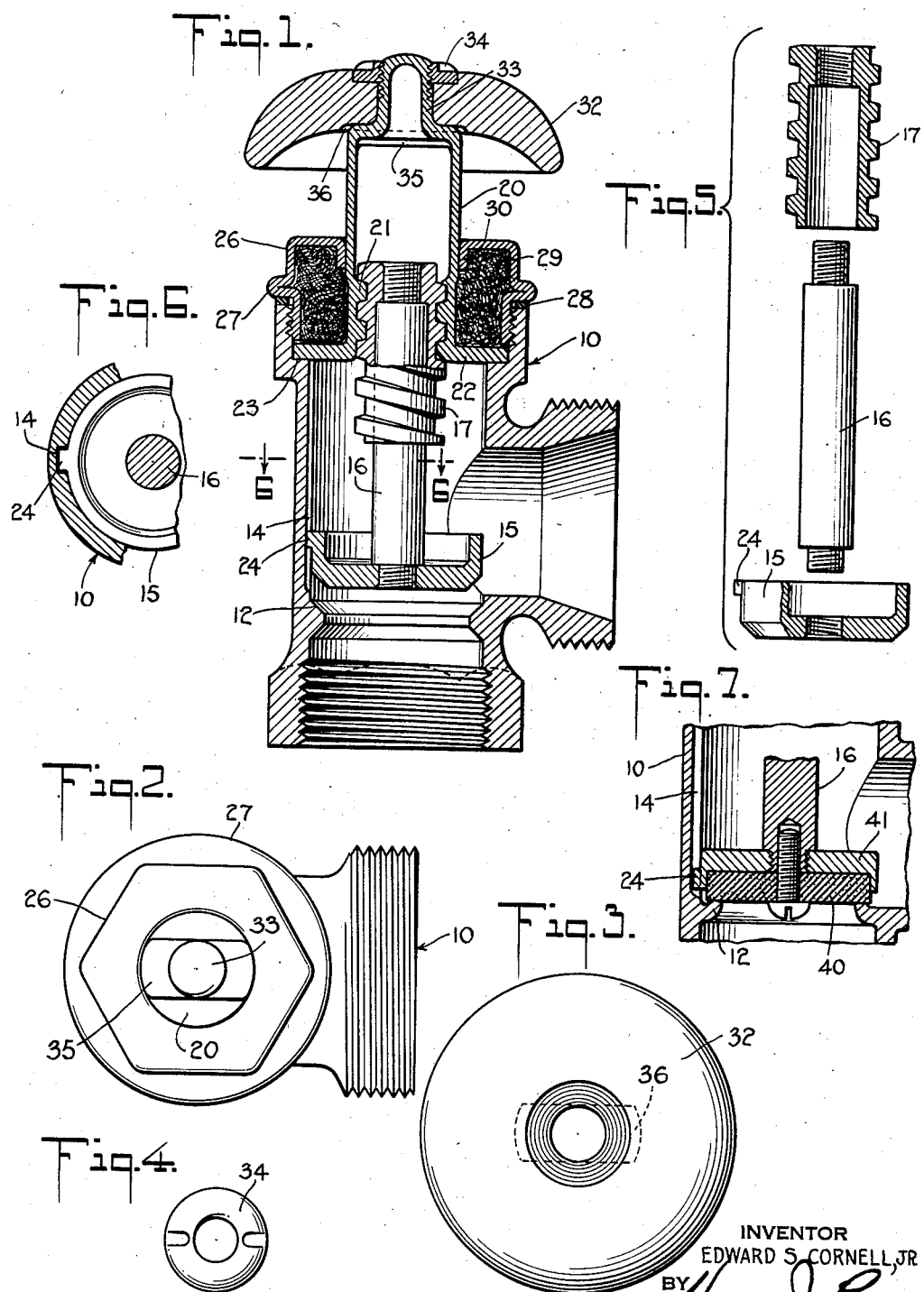
INVENTOR
EDWARD S. CORNELL, JR
BY
HIS ATTORNEY Patented July 23, 1940

2,208,629

UNITED STATES PATENT OFFICE 2,208,629

RADIATOR VALVE OR THE LIKE

Edward Shelton Cornell, Jr., Larchmont, N. Y.

Application January 24, 1939, Serial No. 252,513

4 Claims. (Cl. 251—48)

This invention relates to valves.

In particular, the present invention relates to improvements in valves of the nature of radiator valves or the like, in which economy of manufacture and simplicity of design are important attributes.

It is an object of the invention to provide an improved non-rising stem valve which may be manufactured largely from stampings of metal, or metal elements desirably cold worked to final status from materials of copper or predominantly of copper content.

Further, it is an object of the present invention to provide a valve in which leakage of steam or other fluid around the valve stem, and inflow of atmospheric air about the valve stem into the valve body in the circumstance of vacuum within the radiator or piping served by the valve, are reduced to a minimum, without elaborate or special packing means.

It is yet another object of the invention to provide a valve having means whereby suitable packing material may be compressed about a valve stem actuator in a manner insuring against leakage, while maintaining freedom of operation of said actuator.

It is an additional object of the invention to provide a valve having an improved bonnet construction, said bonnet affording means, supplemental to the valve packing means, for sealing said valve against inflow of atmospheric air, as aforesaid, or leakage of fluid content of the valve.

Other features and avantages will hereinafter appear.

In the accompanying drawing:

Fig. 1 is a sectional elevation of an improved valve embodying the present invention;

Fig. 2 is a plan view of the valve body, the valve handle having been removed;

Fig. 3 is a plan view of a form of valve handle;

Fig. 4 is a plan view of the valve handle securing nut;

Fig. 5 is an exploded view, partly in section, of the valve stem and disc assembly;

Fig. 6 is a section taken through 6—6 of Fig. 1, and illustrating a means for holding the valve disc against rotation; and Fig. 7 is a sectional view showing a second form of valve disc.

Referring to the drawing, a valve 10, Fig. 1, may be of any desired form; the figure illustrates an angle valve suitable to control flow of steam or other thermal fluid to radiators or the like. The valve may be of any suitable material; it is preferred, however, to construct the valve body from commercially pure copper or materials of predominant copper content, by the cold working process disclosed and claimed in my co-pending application Serial No. 12,377, filed March 22, 1935, now Patent No. 2,147,243, granted July 27, 1938, and entitled Method of producing integral wrought valve bodies, and to fabricate other of the valve elements from like material, by stamping or other press operations. Such cold working processes impart desirable physical attributes, such as improved hardness, tensile strength, resistance to corrosion, and the like.

The interior of the valve body may be machined to provide a suitable valve seat 12, and one or more axial grooves 14, for a purpose presently described.

In the embodiment of Fig. 5, the valve stem and disc assembly is advantageously formed of wholly cold worked metallic elements, comprising a valve disc 15, a valve stem 16, and a male-threaded sleeve 17 having threading of suitable shape and pitch. As shown in Fig. 1, the respective elements may be arranged for screw-threaded interassembly.

For moving the valve disc toward or away from the seat, there is provided a valve stem actuator 20, which may comprise a preferably imperforate metal stamping configurated to have a hollow body, near the base of which may be formed female screw threading 21 for cooperation with the threaded sleeve 17. The actuator 20 is provided with a desirably integral flange 22, arranged to bear rotatably upon a shoulder 23 provided within the valve body, in parallelism with the plane of the valve seat. Shoulder 23 may be flat, as shown, or sloping, in which circumstance the overlying portion of flange 22 would have a matching bevel. The preferably cylindrical, vertical walled body portion of the valve actuator is imperforate, and preferably greater in depth than the length of sleeve 17, to afford complete opening of the valve; as shown in Fig. 1, that portion of the body immediately above the threading 21 is of slightly enlarged diameter, to eliminate the possibility of frictional engagement of sleeve 17 with said actuator body.

As apparent from Fig. 1, flange 22 combines with sleeve 17 to form a fluid seal which materially aids the effective length of life of the main fluid sealing packing, the organization of which is presently described. The wearing effect of rotation of the flange 22 against the shoulder 23 improves the fluid sealing function of such flange.

Valve disc 15, see Figs. 5 and 6, has a lug 24, for free slidable movement within the slot 14. Thus, a rotation of the actuator 20 causes the valve disc assembly, held against rotation by lug 24 and groove 14, to rise or fall within the valve body, depending upon the direction of actuator rotation.

In the present invention, valve bonnet means serve in common as an actuator guide and positioner and repository for fluid sealing packing. Such bonnet 26 may advantageously be formed from a sheet metal stamping, given a polygonal formation to provide for the engagement thereof with a wrench or like tool, and having, intermediate such polygonal formation and a lowermost male threaded skirt, a beaded flange 27, which determines the limit of screw threaded insertion of the skirt of the bonnet into the valve body 10. If desired, a gasket 28 may be interposed between said flange and the valve body.

As shown in Fig. 1, the bead 27 establishes the depth of screw-threaded insertion of the bonnet 26 into the valve body; such insertion provides a slight clearance between the lower edge of bonnet 26 and the upper surface of the flange 22, and the valve bonnet thereby accurately positions the actuator 20, while insuring free rotation thereof within the valve body.

Packing material 29 of any suitable type, but preferably compressible and resilient, may be confined within the space defined by bonnet 26 and actuator 20. By the selection of a proper quantity of such packing, the resilient quality thereof serves to urge the flange 22 against the shoulder 21. Preferably, the packing is of a lubricous nature, such as graphited asbestos compounds or the like.

The bonnet 26, as shown, may have a downwardly turned lip 30, to serve as a bearing for the actuator 20.

The diameter of the aperture defined by the lip is preferably closely that of the body of the actuator, but by making said lip 30 frusto-conical, with a very slight degree of slope, the minimum diameter of the lip being slightly less than the outer diameter of the actuator 20 at the point of engagement therewith, the inherent spring quality of the sheet metal may be employed to improve the tightness of engagement of the lip 30 and the actuator 20. Thus, the lip 30 may function additively to the packing 29 to seal the valve against outflow of the thermal fluid, or inflow of atmospheric air in the circumstance of a vacuum or other condition in the heating system or apparatus being served by the valve.

Any desired form of valve handle may be employed. As illustrated, a substantially conventional disc handle 32 has a central aperture, through which a reduced diameter neck 33 of the actuator 20 may be passed. A suitable countersink in the valve handle 32 receives a locking nut 34, threaded for cooperation with the threaded neck 33. The actuator 20 is shouldered, see 35, Fig. 2, for operative association with a suitable groove 36 in the underside of the valve handle 30.

In the embodiment of Fig. 7, I have illustrated a type of valve stem assembly employing a conventional fibrous or like valve disc 40. Such disc may be screw threadedly attached to the valve stem 16, as shown, and may be housed within a suitable disc holder 41, the latter being provided with a lug 24 for operative association with the vertical groove 14 of the valve body.

It will be understood that a vertical tongue or protruding trackway may be formed in the valve body, said tongue or trackway being, like said groove 14, in parallel relationship to said valve stem. With such embodiment, a cooperating groove would be provided on the valve disc, said groove being suitably remote from the disc seating surface per se. The tongue or trackway would find particular application to bodies of conventional "globe valve" formation, inasmuch as it may be otherwise difficult to insure the desired continuous slidable engagement of the valve disc with the valve disc rotation restraining means.

As indicated in Fig. 5, the valve disc assembly provides for the ready replacement of any of the parts thereof, it being understood that the respective elements are screwed sufficiently tightly together to preclude the rotation of either the sleeve 17 or disc 15 with respect to the stem 16. If desired, the ends of the screw threaded extensions of stem 16 may be peened over, subsequent to assembly, to absolutely preclude rotation, or accidental separation of structure.

Whereas I have described my invention by reference to specific forms thereof, it will be understood that many changes and modifications may be made without departing from the spirit of the invention.

I claim:

1. In a valve having a body provided with shoulder means interiorly thereof, the combination with rotatable valve stem actuator means having flange means arranged to be supported on said shoulder means, of valve bonnet means arranged for securement to said valve body and having a downwardly extending portion overlying the upper surface of said flange means in close proximity thereto, whereby said valve stem actuator means may be substantially precluded from displacement outwardly of said valve body.

2. In a valve having a body provided with shoulder means interiorly thereof, the combination with rotatable valve stem actuator means having a flange formed integral therewith and arranged to be supported on said shoulder means for rotation thereon, of valve bonnet means arranged for securement to said valve body and having a skirt portion extending downwardly interiorly of said valve body and overlying the surface of said actuator means flange in close proximity thereto, whereby said valve stem actuator means is restrained from substantial displacement outwardly of said valve body.

3. In a valve, the combination with a shoulder formed in the inner wall of the body of the valve, said shoulder having a substantially smooth continuous upper surface, of rotatable valve stem actuator means having a central substantially cylindrical body portion and a flange formed at the base thereof, said flange being arranged to engage the upper surface of the said shoulder in intimate contact therewith, valve bonnet means having a central aperture defined by a lip arranged for continuous resilient engagement with said actuator body portion and skirt means arranged to overlie the upper surface of said actuator flange in close proximity thereto, and packing means disposed within said bonnet and maintained thereby in compression against said actuator body and said actuator flange means.

4. In a valve having a body provided with seat means, the combination with a shoulder formed in the inner wall of said body in parallelism to said seat means, said shoulder having a substantially smooth continuous upper surface, of rotatable valve stem actuator means having a smooth surfaced flange integral therewith and arranged to engage the surface of the said shoulder in intimate contact therewith, valve bonnet means arranged for securement to said valve body and having a downwardly extending skirt overlying a surface of said actuator flange in close proximity thereto, flange means on said bonnet means for establishing the relative position of said skirt means with respect to the said flange, and packing means disposed within said bonnet and in engagement with said actuator flange.

EDWARD SHELTON CORNELL, Jr.